United States Patent [19]

Moya

[11] Patent Number: 4,556,443

[45] Date of Patent: Dec. 3, 1985

[54] AIR SHUTTLE LABEL DISPENSER

[75] Inventor: Edward J. Moya, San Gabriel, Calif.

[73] Assignee: Avery International Corporation, Pasadena, Calif.

[21] Appl. No.: 474,715

[22] Filed: Mar. 11, 1983

[51] Int. Cl.⁴ .......................... B65C 9/28; B32B 31/00; B44C 1/00; F16K 31/143

[52] U.S. Cl. .................................... 156/356; 156/497; 156/542; 156/584; 156/DIG. 38; 251/63; 137/624.13

[58] Field of Search ............... 156/541, 542, 361, 468, 156/475, 584, DIG. 31, DIG. 18, 356, 358, 362, 444, 497, DIG. 33, DIG. 38; 141/8; 251/63; 137/624.13

[56] References Cited

U.S. PATENT DOCUMENTS

| | | | |
|---|---|---|---|
| 3,483,059 | 12/1969 | Dinter | 156/542 |
| 3,645,832 | 2/1972 | Sauer | 156/361 |
| 4,089,725 | 5/1978 | Crankshaw et al. | 156/542 |
| 4,315,506 | 2/1982 | Kayser et al. | 251/63 |
| 4,478,562 | 10/1984 | Schippers et al. | 137/624.13 |

*Primary Examiner*—Edward Kimlin
*Assistant Examiner*—L. Falasco
*Attorney, Agent, or Firm*—Poms, Smith, Lande & Rose

[57] ABSTRACT

A system for the high speed application of pressure sensitive labels to products includes an apertured label receiving head having both some vacuum apertures or ports and also some high pressure blower apertures or ports. Connected to the vacuum ports is a main vacuum conduit and similarly connected to the high pressure blower ports is a source of high pressure air which is applied in pulses to an input high pressure air conduit. The labels are dispensed across the faceplate of the unit and are held onto the faceplate by the vacuum applied to the vacuum apertures or ports. When it is desired to apply a label to the product, a pulse of high pressure air is applied to the unit and a shuttle valve within the faceplate or immediately adjacent thereto, is actuated by the high pressure pulse of air to slide across and close off the vacuum conduit, while high pressure air is simultaneously applied to all of the blower ports to blow the label across onto the product.

19 Claims, 8 Drawing Figures

AIR SHUTTLE LABEL DISPENSER

FIELD OF THE INVENTION

This invention relates to arrangements for the application of pressure sensitive labels by air pressure.

BACKGROUND OF THE INVENTION

It has previously been proposed to apply labels of the pressure sensitive type to products by first dispensing a label onto a head, holding the label by a vacuum, and then blowing the label onto the product. However, these systems have been relatively slow and have not been widely used up to the present time. Two prior art patents which disclose this type of system include A. Sauer U.S. Pat. No. 3,645,832 granted Feb. 29, 1972, and H. Dinter U.S. Pat. No. 3,483,059 granted Dec. 9,1969. In both of these systems, a substantial period of time is required to shift over from the vacuum holding mode of operation to the blowing mode of operation, and relatively time-consuming and/or complex arrangements are required for making the transition. This involves the location of the valves for changing from one mode to the other at a point which is located relatively far from the face plate, and in the case of the Dinter patent, of an electromechanical member which is shifted by a mechanical linkage.

Accordingly, a principal object of the present invention is to greatly increase the speed of operation of pressure-sensitive label dispensing systems using vacuum holding for labels and subsequent high pressure air to blow the labels onto the product.

SUMMARY OF THE INVENTION

In accordance with the a specific embodiment of present invention, the dispensing head includes both a faceplate which is apertured both with a large number of high pressure air apertures or ports, and also with a relatively small number of vacuum apertures or ports. The vacuum ports or apertures are connected to a main vacuum conduit; and similarly, the high pressure air ports are connected to a main input conduit for high pressure air Which is periodically pulsed. A small shuttle valve located close to the face plate is provided, and this shuttle valve is actuated by the high pressure air to shuttle off the vacuum conduit concurrently with the application of a pulse of air to all of the high pressure ports.

In accordance with a broad aspect of the invention, a combined vacuum and high pressure air label applicator includes a shuttle valve operated by pulses of high pressure air which shut off the vacuum concurrently with the application of the pulses of high pressure air to the labels to blow the labels onto the product.

Subordinate features of the invention include the use of a high pressure plenum between the input high pressure air conduit and the apertures, and in order to apply the pulses of air in a uniform manner to all the apertures, a baffle plate and an air deflector are employed, in order to avoid the application of high pressure air directly from the conduit to any one particular one or group of the high pressure output ports, while little forceful air is applied to others. In addition, the shuttle valve may be a small plastic member which is open at one side to the high pressure air conduit so that it may be immediately moved when a pulse of air arrives, and on the other side of the plastic shuttle valve member is the vacuum conduit to be closed off as the shuttle valve is moved. The shuttle valve member is preferably biased to the open position by a small coil spring or the like, so that it may easily overcome this bias when a pulse of high pressure air is applied to the valve.

Conventional peeling blade arrangements are provided to separate the pressure-sensitive labels from the backing tape and dispense the labels across the faceplate of the unit.

Through the use of the new system, the speed of application of labels may be increased from the prior arrangements where the labels were only applied at a rate of less than 100 labels per minute up to speeds of about six hundred or more labels per minute.

Other objects, features and advantages of the invention will become apparent from a consideration of the following detailed disclosure and from the accompanying drawings.

DETAILED DESCRIPTION

Figure 1:
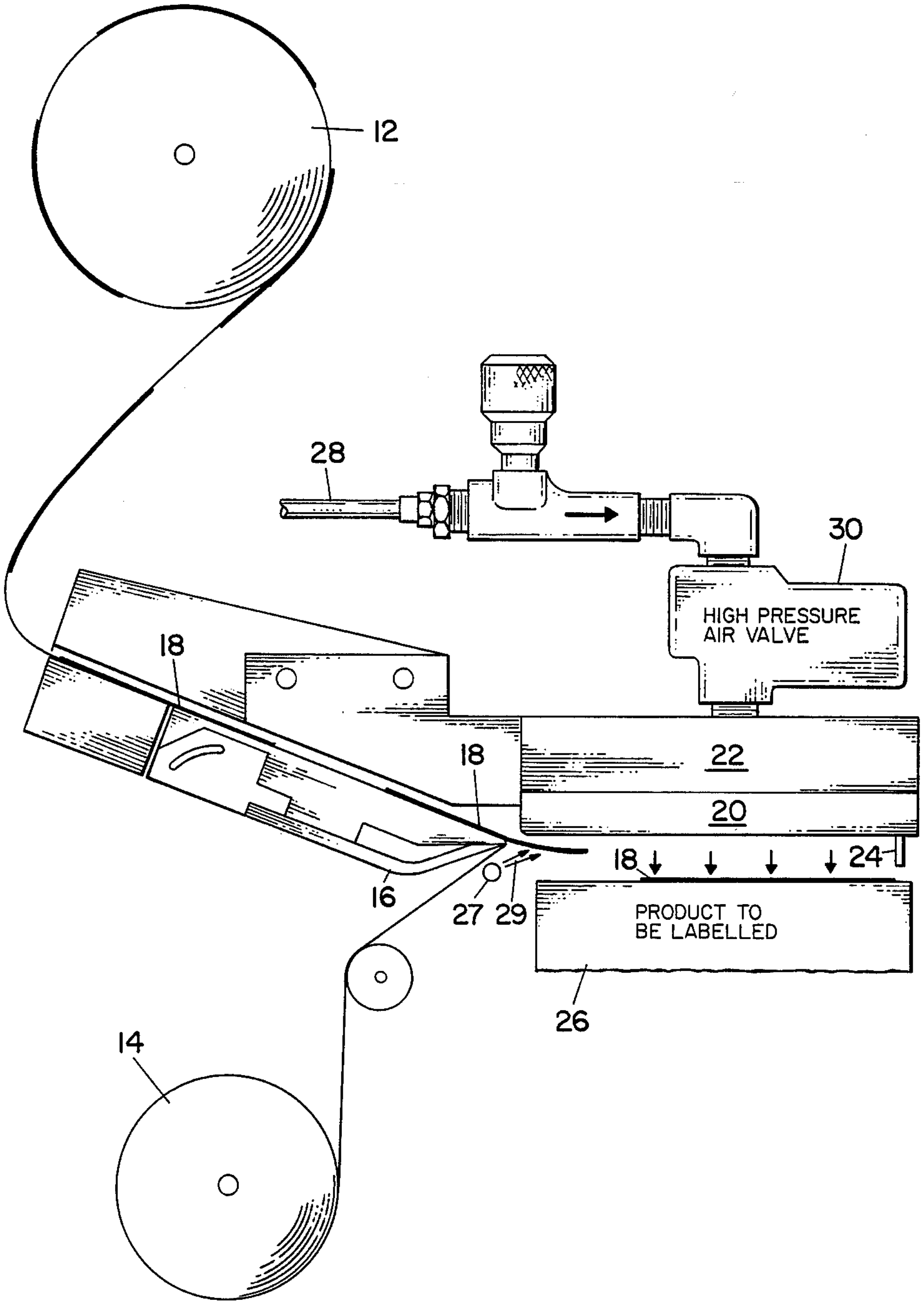
FIG. 1 is an overall view of a system showing the label dispensing head, the peeling blade for supplying the labels to the dispensing head, and the product to be labeled.

Referring more particularly to the drawings, FIG. 1 shows the overall system, including an input reel of backing tape and labels 12 and an output reel 14 for winding up the backing tape. A peeling blade 16 is provided for dispensing the labels 18 into the desired position across the front of the face plate 20, which together with the cover plate 22 make up the dispensing head. It may be observed that the stop pins 24 restrain the forward movement of the labels 18 while they are held by vacuum openings in the head 20, 22, prior to being dispensed by air pressure across onto the product 26 which is to receive the labels. Air under pressure is supplied to the tube 27 and a slot in tube 27 provides an air stream indicated by arrows 29 to assist in the dispensing of labels 18 onto the faceplate 20.

Incidentally, it is to be understood that the showing of the reels 12, 14 and the peeling blade 16 is merely schematic, as this type of unit is well known in the label application field.

Pulses of high pressure air 28 are supplied to the application head 20, 22 through an electromagnetically operated high pressure air valve 30.

Also coupled to the applicator head 20, 22, but not shown in FIG. 1 is a vacuum line, as discussed in more detail below in connection with subsequent figures of the drawings.

Figure 2:
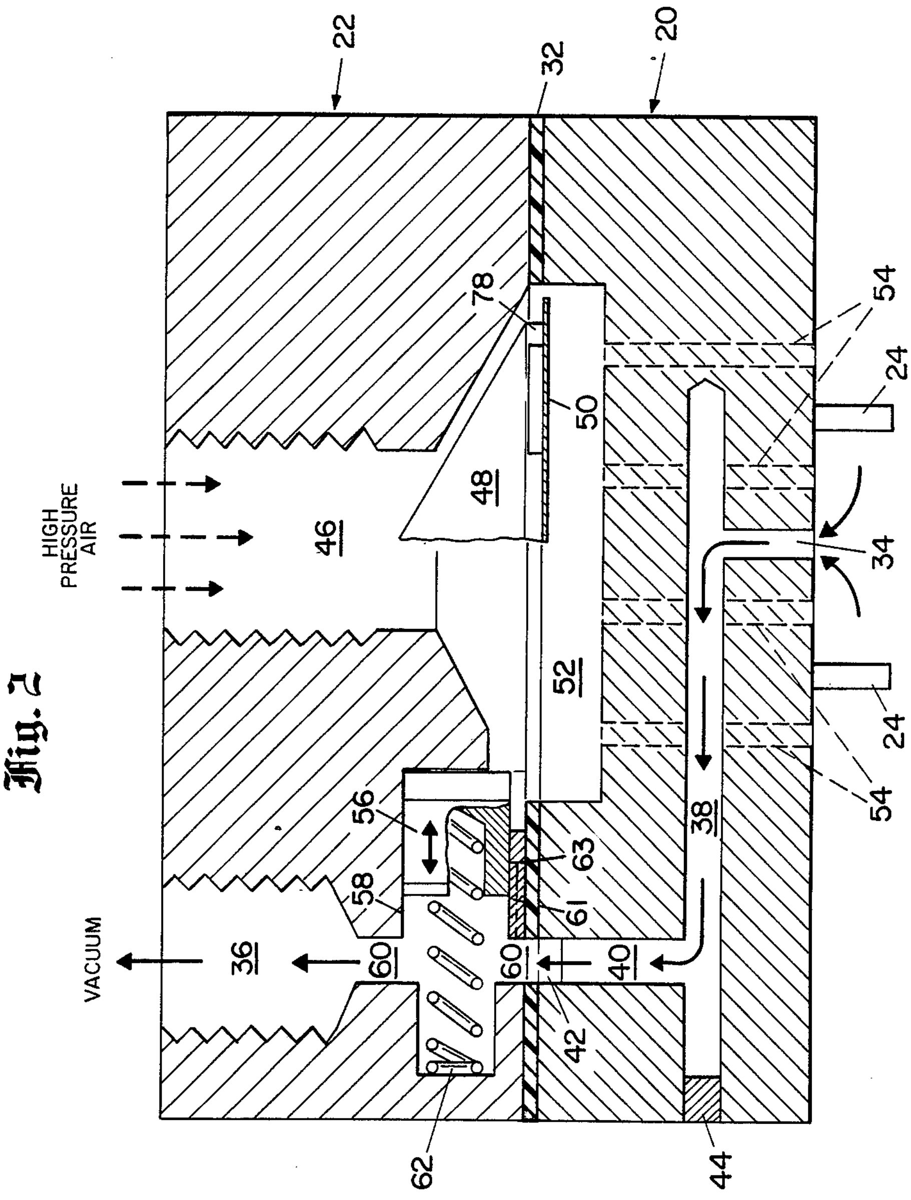
FIG. 2 is a detailed assembly drawing showing the, dispensing head including both a faceplate and a cover, and the shuttle valve included within the assembly, all illustrating the principles of the present invention.

FIG. 2 is a transverse cross-sectional view through the dispensing head with the cover 22 and the face plate 20 being separated by a gasket 32. Visible at the lower face of the dispensing head 20, 22 are the stop pins 24 which arrest the forward movement of the labels as they are applied across the face of lower face plate 20. They are then held in position on the lower surface of face plate 20 by a series of three or four vacuum apertures 34, one of which is shown in cross section in FIG. 2, substantially at the center thereof. A main vacuum conduit or channel 36 is permanently connected to a vacuum conduit not shown in FIG. 2 at the upper left thereof. Drilled interconnected passageways 38 and 40 couple the vacuum aperture or port 34 with the main vacuum conduit 36. A channel 42 which runs along the upper surface of the face plate 20 serves to interconnect a series of the vacuum ports 34. Plugs 44 are provided to seal off the ends of the drilled holes 38.

Pulses of high pressure air are supplied to the cover plate 22 through the input conduit 46. These are applied to the air deflector 48 and are further diffused by the baffle plate 50 before being supplied to the high pressure air plenum 52. From the plenum 52 air is directed through a large number of high pressure output ports or apertures 54 to blow the labels across to the product.

In addition, the high pressure air is applied to the shuttle valve 56 which is mounted in a recess 58 in the cover plate. The shuttle valve 56 is normally biased toward the right, away from the vacuum conduit 60 by a light coil spring 62. However, the coil spring 62 only exerts a relatively weak force to bias the shuttle valve element 56 to the right, as shown in FIG. 2; and when pulses of high pressure air are applied through input conduit 56, this high pressure air is coupled to the space behind the valve shuttle 56, and the valve member is rapidly moved to the left to close off the vacuum channel 60 leading from the main vacuum output 36. Simultaneously, of course, high pressure air is applied through the plenum 52 to all of the output ports 54, and the labels 18 is applied at high velocity across to the product 26 (see FIG. 1). If desired, a bypass channel 61 may be provided to simultaneously apply high pressure air to manifold groove 42 to more rapidly reduce any vacuum holding force on the labels.

It is this high speed local shuttle valve 56 and its operation directly by the high pressure air which permits the rapid application of the labels to the products. As mentioned above, it represents the difference in the possible speed of application of labels from a matter of only about 100 labels per minute up to six hundred or more labels per minute, which is the rate at which the new units as described herein may be operated.

Figure 3:
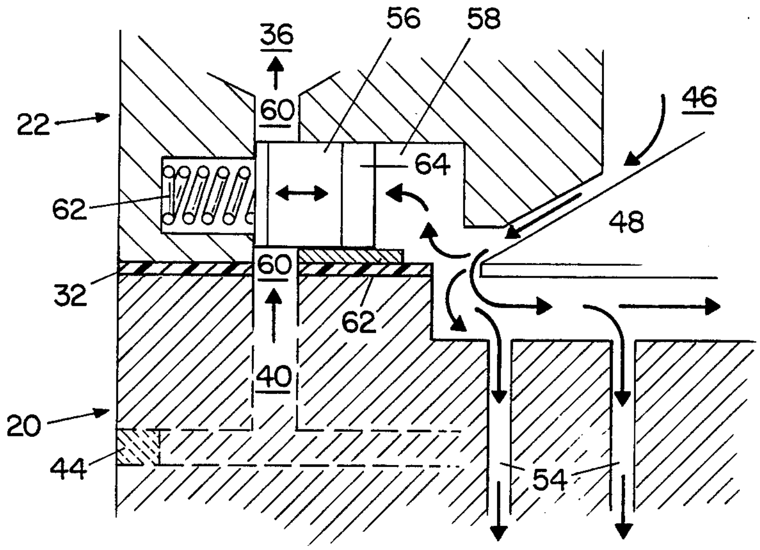
FIG. 3 is an enlarged showing illustrating the operation of the shuttle valve.

FIG. 3 shows the air shuttle valve assembly in somewhat greater detail, and shows it in the closed position with air from the conduit 40 having forced the plastic shuttle member 56 to the left, closing off the channel 60 against the pressure of the relatively weak coil spring 62. Also shown in FIG. 3 is the air shuttle valve retaining plate 63 which is secured to the bottom of the cover member 22 to hold the valve member 56 in place as it moves back and forth. The wide chamfer 64 on the back end of the plastic valve member 56 may also be noted, as this provides access for the high pressure air from the high pressure conduit 46 to move the shuttle valve 56 forward into its blocking position.

Figure 4:
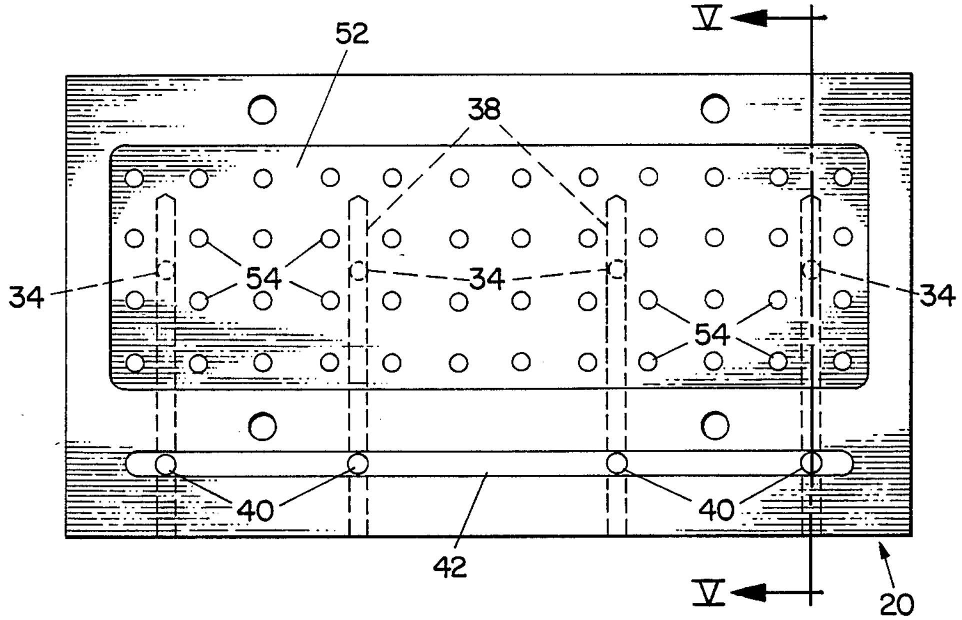
FIG. 4 is a top view of the faceplate portion of the dispensing head.
Figure 5:
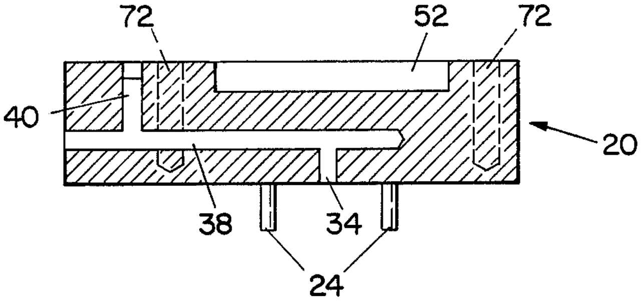
FIG. 5 is a cross-sectional view taken along lines V—V of FIG. 4.

The remaining figures of the drawings are shown for completeness to indicate the construction of the cover plate 22 and the faceplate 20. FIG. 4 is a top view of the faceplate showing the plenum 52 and various high pressure air openings 54 and the vacuum openings 34. In addition, the milled recess 42 which is essentially a vacuum manifold conduit is also shown. FIG. 5 is a cross-sectional view taken along dashed lines V—V of FIG. 4 and also shows the same arrangements as described above, in connections with FIG. 4 from another aspect. In addition, the tapped holes 72 are shown and these are provided for securing the cover plate 22 to the faceplate 20, with the intermediate gasket in its intermediate gasket 32 between the two ports.

Figure 6:
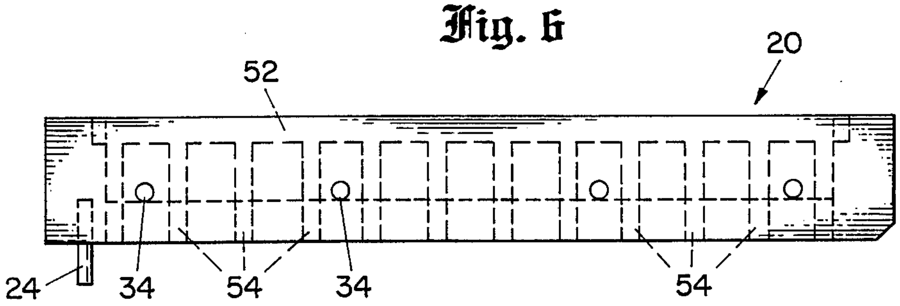
FIG. 6 is a side view of the faceplate.

FIG. 6 is the final view of the set relating to the faceplate, and is a side view showing the plenum 52, the stop members 24, the holes 54 and the transverse holes 34 prior to having been plugged.

Figure 7:
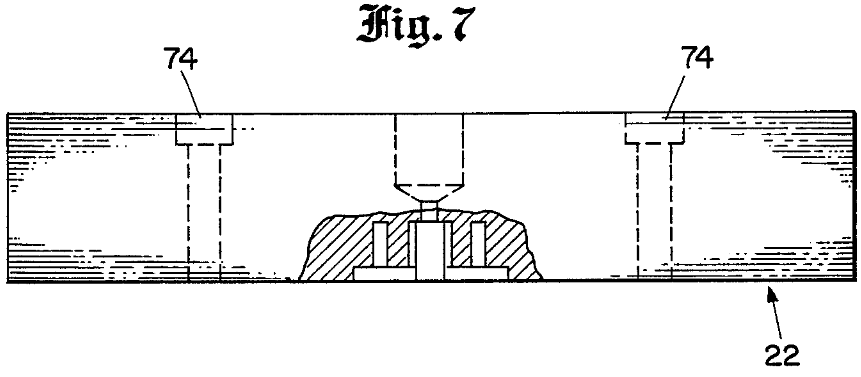
FIG. 7 is a side view of the cover plate.
Figure 8:
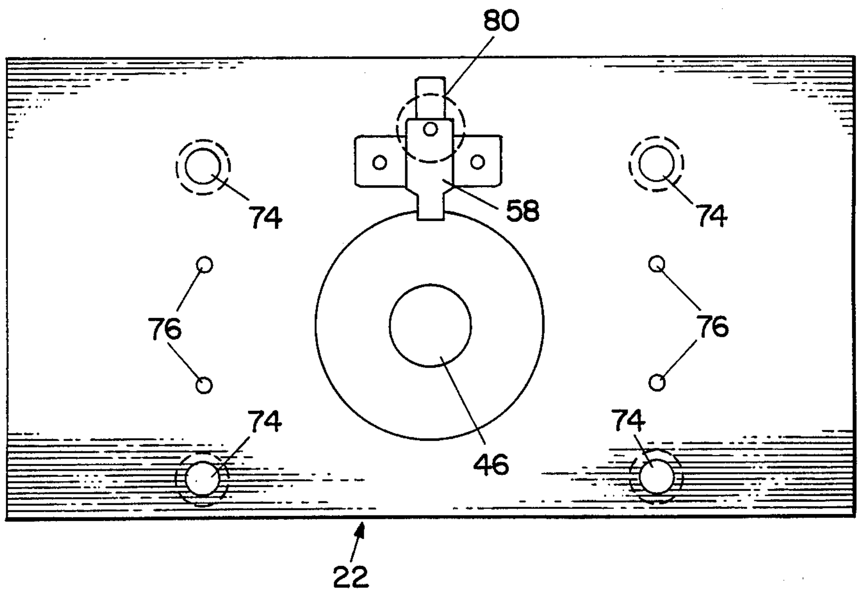
FIG. 8 shows the bottom of the cover plate.

FIGS. 7 and 8 are a final pair of drawings which show the side view and the bottom view, respectively of the cover plate. FIG. 7 shows the countersunk holes 74 to receive bolts which will have a clearance through the cover plate and which will be secured in the tapped holes 72 as shown hereinabove in FIG. 5, in the faceplate. In FIG. 8, the countersunk hole 74 appears and also shown are the tapped holes 76 which receive fasteners to retain the baffle plate 50 and the standoff members 78, which appear in FIG. 2, in place onto the cover plate.

FIG. 8 also shows the opening 46 for high pressure air, together with the conical zone surrounding it for receiving the air deflector 48 (see FIG. 2). Also shown in FIG. 8 is the recess 58 for receiving the air shuttle valve member, and the recess 80 for receiving the biasing spring 62 for holding the shuttle valve in its normally open position.

For completeness, it may be noted that the faceplate is about $\frac{5}{8}$ inch thick and about $2\frac{3}{8}$ inches by $4\frac{1}{2}$ inches in overall size; while the cover plate is about $\frac{7}{8}$ inch thick, and has substantially the same over-all dimensions as the faceplate. The shuttle valve, therefore, is within an inch and a half of the front of the face to which the labels are held; and it is this local positioning of the shuttle valve, and its actuation directly by the same pulses of air which blow the label, which is believed to contribute strongly to the improved very high speed operation of the present label applicator system.

In conclusion, it is to be understood that the foregoing description and the illustrated embodiments of the invention are merely illustrative of the principles of the present invention. The important features involve the actuation of a shuttle valve by the high pressure air at a point immediately adjacent the working surface of the unit, so that undue delay does not occur. It is to be understood that the shuttle valve could be implemented by a circular member rather than by the rectangular valve configuration shown, that when smaller labels are employed, certain of the apertures, both vacuum and high pressure, may be blocked off, and that other similar minor modifications are within the scope of the present invention. Accordingly, the present invention is not to be limited to that precisely as shown and described hereinabove.

What is claimed is:

1. A system for high speed application of labels to products comprising:

an apertured label receiving head, one face of said head including a plurality of vacuum ports or apertures, and a larger plurality of high pressure air blower ports or apertures;

first, vacuum conduit means for drawing air from said vacuum apertures to hold a label on said head;

valve means in said head for shutting off said vacuum conduit means;

means for normally biasing said valve to an open state;

second, high pressure air conduit means for supplying periodic pulses of high pressure air to said high pressure air ports or apertures; and means for actuating said valve means to shut off said vacuum conduit means in response to pulses of high pressure air from said second conduit means;

whereby said labels are released from vacuum restraining forces concurrently with arrival of a blast of air from said blower ports or apertures to blow the labels away from said face of said head at high speed.

2. A system as defined in claim 1 further comprising means for dispensing pressure sensitive labels onto said face of said label receiving head.

3. A system as defined in claim 1 wherein said valve means includes a slidable plastic member open at one end to receive high pressure air from said second conduit means, and being positioned with said first vacuum conduit means aligned with the other end of said slidable plastic member for closure thereby when said impulses of high pressure air are received.

4. A system as defined in claim 3 wherein said biasing means is a coil spring urging said slidable plastic member away from said vacuum conduit means and toward said high pressure conduit means.

5. A system as defined in claim 1 wherein said valve means is entirely located within one and one-half inches of said face of said label receiving head.

6. A system as defined in claim 1 further comprising high pressure plenum means for evenly distributing high pressure air to all of said high pressure ports or apertures.

7. A system as defined in claim 6 further comprising diffusing means for supplying high pressure air from said second high pressure input conduit means to said plenum.

8. A system as defined in claim 7 wherein said diffusing means includes an air deflector member facing the input conduit, and a baffle plate overlying said plenum.

9. A shuttle valve label applicator system as defined in claim 1 wherein said label receiving head includes a faceplate and a cover plate overlying one-another, and wherein the matching surfaces of said faceplate and cover plate include recessed means (1) for receiving said valve means, and (2) for directing high pressure air and vacuum pressure to said apertures or ports.

10. A system for high speed application of labels to products comprising:

an apertured label receiving head, one face of said head including a plurality of ports or apertures;

first, vacuum conduit means for drawing air from a first set of said apertures or ports to hold labels on said head;

valve means in said head for shutting off said vacuum conduit means;

means for normally biasing said valve to an open state;

second, high pressure air conduit means for supplying periodic pulses of high pressure air directly to an entirely different set of said ports or apertures; and means for actuating said valve means to shut off said vacuum conduit means in response to pulses of high pressure air from said second conduit means;

whereby said labels are released from vacuum restraining forces concurrently with arrival of a blast of air applied from a different set of ports or apertures to blow the labels away from said face of said head at high speed.

11. A system as defined in claim 10 further comprising means for dispensing pressure sensitive labels onto said face of said label receiving head.

12. A system as defined in claim 10 wherein said valve means includes a slidable plastic member open at one end to receive high pressure air from said second conduit means, and being positioned with said first vacuum conduit means aligned with the other end of said slidable plastic member for closure thereby when said impulses of high pressure air are received.

13. A system as defined in claim 12 wherein said biasing means is a coil spring urging said slidable plastic member away from said vacuum conduit means and toward said high pressure conduit means.

14. A system as defined in claim 10 wherein said valve means is entirely located within one and one-half inches of said face of said label receiving head.

15. A system as defined in claim 10 further comprising high pressure plenum means for evenly distributing high pressure air to all of said high pressure ports or apertures.

16. A system as defined in claim 15 further comprising diffusing means for supplying high pressure air from said second high pressure input conduit means to said plenum.

17. A system as defined in claim 16 wherein said diffusing means includes an air deflector member facing the input conduit, and a baffle plate overlying said plenum.

18. A shuttle valve label applicator system as defined in claim 10 wherein said label receiving head includes a faceplate and a cover plate overlying one-another, and wherein the matching surfaces of said faceplate and cover plate include recessed means (1) for receiving said valve means, and (2) for directing high pressure air and vacuum pressure to said apertures or ports.

19. A system for high speed application of labels to products comprising:

an apertured label receiving head, one face of said head including a plurality of vacuum ports or apertures, and a larger plurality of high pressure air blower ports or apertures;

first, vacuum conduit means for drawing air from said vacuum apertures to hold a label on said head, said vacuum conduit means being of relatively small cross-sectional area comparable to the area of said vacuum ports;

shuttle valve means in said head for directly shutting off said vacuum conduit means;

means for normally biasing said shuttle valve means to an open state;

second, high pressure air conduit means for supplying periodic pulses of high pressure air to said high pressure air ports or apertures; and means for directly actuating said shuttle valve means by said high pressure air pulses to shut off said vacuum conduit means in response to said pulses of high pressure air from said second conduit means;

whereby said labels are released from vacuum restraining forces concurrently with arrival of a blast of air from said blower parts or apertures to blow the labels away from said face of said head at high speed.

* * * * *